M. DOWNEY.
COMBINED HEATING AND COOLING-MILK CAN.
No. 178,610. Patented June 13, 1876.
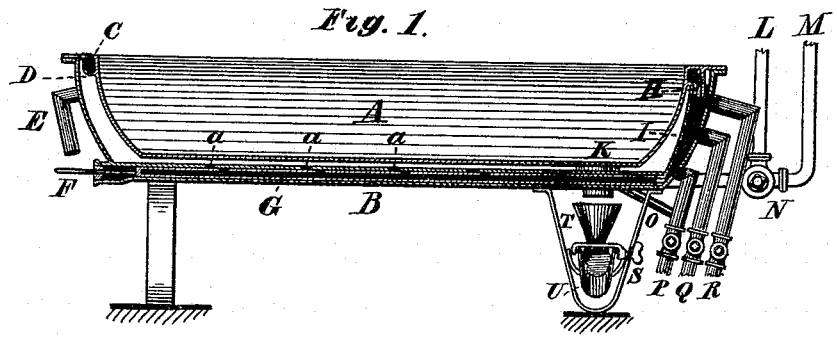
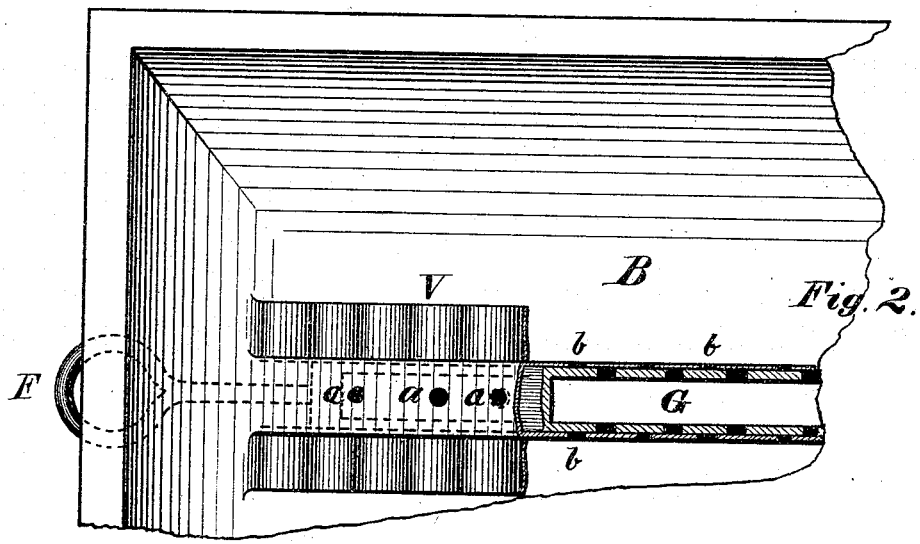
Witnesses:
Edward K. Hill.
James Greene.
Inventor:
Michael Downey.
BY HIS ATTY.

UNITED STATES PATENT OFFICE.

MICHAEL DOWNEY, OF BARRE, MASSACHUSETTS.

IMPROVEMENT IN COMBINED HEATING AND COOLING MILK-CANS.

Specification forming part of Letters Patent No. 178,610, dated June 13, 1876; application filed March 27, 1876.

*To all whom it may concern:*

Be it known that I, MICHAEL DOWNEY, of Barre, in the county of Worcester, State of Massachusetts, have invented certain Improvements in Pans for Heating and Cooling Milk and Dairy purposes, which improvements are fully described in the following specification.

My invention relates to the handling and preparing milk in dairy processes, and more particularly to scalding or heating and cooling the fresh milk, extracting the cream, and facilitating the transfer of the residue to the cheese-department.

It is designed to furnish, most economically, a convenient apparatus for accomplishing these objects in the same pan expeditiously, and give ample facilities for keeping all parts clean and sweet for use.

Its nature is shown in the following description and accompanying drawings of a pan and its accompaniments embodying my invention.

In said drawings, Figure 1 is a side view with the side removed to show the inclosed parts; and Fig. 2 shows same parts on a larger scale, hereinafter more particulaly described.

The same letters indicate the same parts wherever they occur.

B is the outside pan, performing the office of both heater and cooler when desired, having a passage, G, along its bottom, in which a slide is fitted and operated by the handle F, both G and F having two sets of openings—one in the top, as $a\ a$, and the other in the sides, $b\ b$, so arranged that by moving the slide F either set may be opened and the other closed. The openings $b\ b$ are covered the entire length of B by the broad corrugated or ribbed flange V, which distributes or diffuses the flow from them and prevents the direct flow against the pan A above. The passage G is connected to the cold-water pipe L, and the hot-water or steam pipe M with a stop-cock, N, so arranged that either can be admitted separately or both shut off, and at E is a pipe to connect with the hot-water or steam producing coil to return the flow after passing through B. A is the inner or milk pan, fitting into B, with a small space all round it, its rim resting on B, and making a tight joint when steam is to be used, and having a chamber, C, with small openings into B, and a discharge-pipe, H, leading into the escape I, said chamber extending all round the pan, and leading off from all sides of it to the discharge. The escape I has numerous openings into B, and several pipes, P Q R, at different heights, with stop-cocks so arranged that the pan B may be filled any desired height, and a flowing stream be passed through it at that height. At $o$ is a waste-pipe, from the bottom of B to P, for emptying it entirely when desired, and at K is a discharge from A, through which the milk is drawn off into the open trough U to be taken away. These are thus made for the purpose of enabling the attendant to remove and clean them easily, the whole being supported in any suitable manner.

To use the apparatus according to the latest and most approved systems, the fresh milk is put into the pan A, and the slide F set so that the openings $b\ b$ are open. The steam or hot water is admitted and continued until the milk is heated to 133° or 135° Fahrenheit, or thereabout. The flow, passing out under the flange V, is spread and diffused, and the heat is given to A very equably, preventing any danger of overheating any part, as might be the case were the flow to impinge directly against A, the chamber C conducting a current off to the discharge from all around the rim of the pan, the pipe E allowing the flow to be continued, as stated.

When the milk is heated to the degree mentioned, the heat is shut off, and the slide F changed, and the cold water turned on, and, flowing out at $a\ a$, &c., strikes directly against the bottom of A, cooling it in the most rapid manner, and the escape-pipe, corresponding to the height of the milk in A, is opened, so as to keep the cold water in B at about the same height. This prevents the too rapid cooling of the pan A above the milk, and prevents that troublesome condensation called "sweating." The cold water is allowed to flow until the milk is cooled to any desired degree. When the cream has risen and been removed, the remainder is drawn off through K for further use.

What I claim as new, and desire to secure by Letters Patent, is—

The combination of the cold and hot water or steam pipes L M, the passage G, having its openings $a\ a\ b\ b$ controlled by the slide F, the diffusing-flange V, and the pans A and B, all constructed and operating substantially as and for the purposes described.

MICHAEL DOWNEY.

Witnesses:
JAMES GREENE,
JAS. G. ARNOLD.